United States Patent
Wei et al.

(10) Patent No.: US 9,699,005 B2
(45) Date of Patent: Jul. 4, 2017

(54) ECHO DISCRIMINATING DEVICE AND METHOD THEREOF

(71) Applicant: MStar Semiconductor, Inc., Hsinchu Hsien (TW)

(72) Inventors: Fong-Shih Wei, Zhubei (TW); Chih-Cheng Kuo, Zhubei (TW); Jen-Hsing Wang, Zhubei (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/060,673

(22) Filed: Mar. 4, 2016

(65) Prior Publication Data
US 2016/0269081 A1    Sep. 15, 2016

(30) Foreign Application Priority Data
Mar. 9, 2015   (TW) .............................. 104107394 A

(51) Int. Cl.
*H04L 25/02* (2006.01)
*H04L 25/03* (2006.01)

(52) U.S. Cl.
CPC ........ *H04L 25/0212* (2013.01); *H04L 25/022* (2013.01); *H04L 25/03159* (2013.01)

(58) Field of Classification Search
CPC ... H04L 25/0212; H04L 25/022; H04B 3/493; H04B 7/15585; H04M 9/082; H04M 3/002
See application file for complete search history.

(56) References Cited

U.S. PATENT DOCUMENTS

| 2003/0058952 A1* | 3/2003 | Webster .............. H04L 25/0226 375/260 |
| 2008/0239941 A1* | 10/2008 | Gold-Gavriely .... H04L 27/2665 370/210 |

\* cited by examiner

*Primary Examiner* — Vineeta Panwalkar
(74) *Attorney, Agent, or Firm* — Edell, Shapiro & Finnan, LLC

(57) ABSTRACT

An echo discriminating method capable of discriminating whether an echo occurs in a communication channel is provided. The echo discriminating device includes: a channel estimation unit, that receives a baseband signal and generates a plurality of estimated channel responses according to a plurality of subcarriers of the baseband signal; a transforming unit, that transforms the estimated channel responses to generate a plurality of estimated channel frequency responses; a calculating unit, that calculates a representative value of each of the subcarriers to generate a plurality of representative values; a characteristic value generating unit, that generates a characteristic value according to the representative values; and a determining module, that determines whether the echo occurs according to the characteristic value and the representative values to obtain a determination result.

17 Claims, 3 Drawing Sheets

ECHO DISCRIMINATING DEVICE AND METHOD THEREOF

This application claims the benefit of Taiwan application Serial No. 104107394, filed Mar. 9, 2015, the subject matter of which is incorporated herein by reference.

BACKGROUND OF THE INVENTION

Field of the Invention

The invention relates in general to an echo discriminating device and method, and more particularly to an echo discriminating device and method capable of discriminating whether an echo occurs in a communication channel.

Description of the Related Art

In some communication channels, radio waves from a transmitting end are propagated non-directionally, and arrive at a receiving end via many different paths. Thus, the receiving end receives more than one signal. Due to different propagation paths, these different signals have different attenuation and delay levels. Such attenuation and delay result in an unstable data transmission rate and form multipath propagation effects. Further, when the transmitting end and the receiving end move relatively to each other, different available propagation channels on the moving paths of the transmitting and/or receiving end are obtained, such that not only the amplitude and phase of transmitted signals are varied and delayed, but also the number of signals received by the receiving end is changed. In short, various changes in the received signals are incurred due to transmission delay caused by multipath propagation. Further, multipath propagation may also be explained as follows. When a pulse signal is transmitted from a transmitting end, if a plurality of analyzable paths are caused by a multipath effect, a receiving end will receive signals coming from different paths but containing the same information. Each of the analyzable paths has a predetermined delay, which results in inter-symbol interference (ISI), as an echo in a valley, hence degrading the transmission quality. Therefore, it is essential that an echo be correctly discriminated and eliminated by appropriate equalization and signal processing.

In known technologies, a receiver circuit generates a channel response by a channel estimator, and observes the estimated channel response in the time domain to determine conditions of the channel. More specifically, an issue of known technologies is that, because the channel response is changeable with time, when signal changes of the channel response are observed in the time domain, the receiving end may not be able to identify actual changes in the channel response or further changes due an echo effect caused by multipath channels. Thus, an incorrect communication mechanism may be adopted, hence degrading the performance of communication transmission.

SUMMARY OF THE INVENTION

The invention is directed to an echo discriminating device and an echo discriminating method for discriminating whether an echo occurs in a channel.

According to an embodiment of the present invention, an echo discriminating device includes: a channel estimation unit, that receives a baseband signal, and generates a plurality of estimated channel responses according to a plurality of subcarriers of the baseband signal; a transforming unit, that transforms the plurality of estimated channel responses to generate a plurality of estimated channel frequency responses; a calculating unit, that calculates a representative value of each of the plurality of subcarriers to generate a plurality of representative values; a characteristic value generating unit, that generates a characteristic value according to the plurality of representative values; and a determining module, that determines whether the echo occurs according to the characteristic value and the plurality of representative values.

According to another embodiment of the present invention, an echo discriminating device, performed by a receiver, includes: receiving a baseband signal comprising a plurality of subcarriers, and generating a plurality of estimated channel responses according to the plurality of subcarriers of the baseband signal; transforming the plurality of estimated channel responses to generate a plurality of estimated channel frequency responses; calculating a representative value of each of the plurality of subcarriers to generate a plurality of representative values; generating a characteristic value according to the plurality of representative values; and determining whether the echo occurs according to the characteristic value and the plurality of representative values.

In the echo discriminating device and method of the present invention, according to the estimated channel responses obtained by the channel estimation unit in the receiver circuit, the characteristics that the estimated channel responses display on the spectrum are observed, analyzed, compared and statistically calculated, and it is discriminated whether an echo occurs in the channel. Compared to conventional solutions, the present invention eliminates an issue of misjudgment caused by an unclear observation in the time domain, such that a communication system may refer to the discrimination result of the present invention to perform corresponding adjustment for eliminating the echo.

The above and other aspects of the invention will become better understood with regard to the following detailed description of the preferred but non-limiting embodiments. The following description is made with reference to the accompanying drawings.

DETAILED DESCRIPTION OF THE INVENTION

The disclosure of the present invention includes an echo discriminating device and method capable of learning whether an echo occurs in a channel. The device and method may be applied to a receiving end of wireless communication, particularly to an orthogonal frequency-division multiplexing (OFDM) receiver.

In possible implementation, one person skilled in the art can choose equivalent elements or steps to achieve the present invention according to the disclosure of the application. That is, the implementation of the present invention is not limited to the embodiments below.

Figure 1:
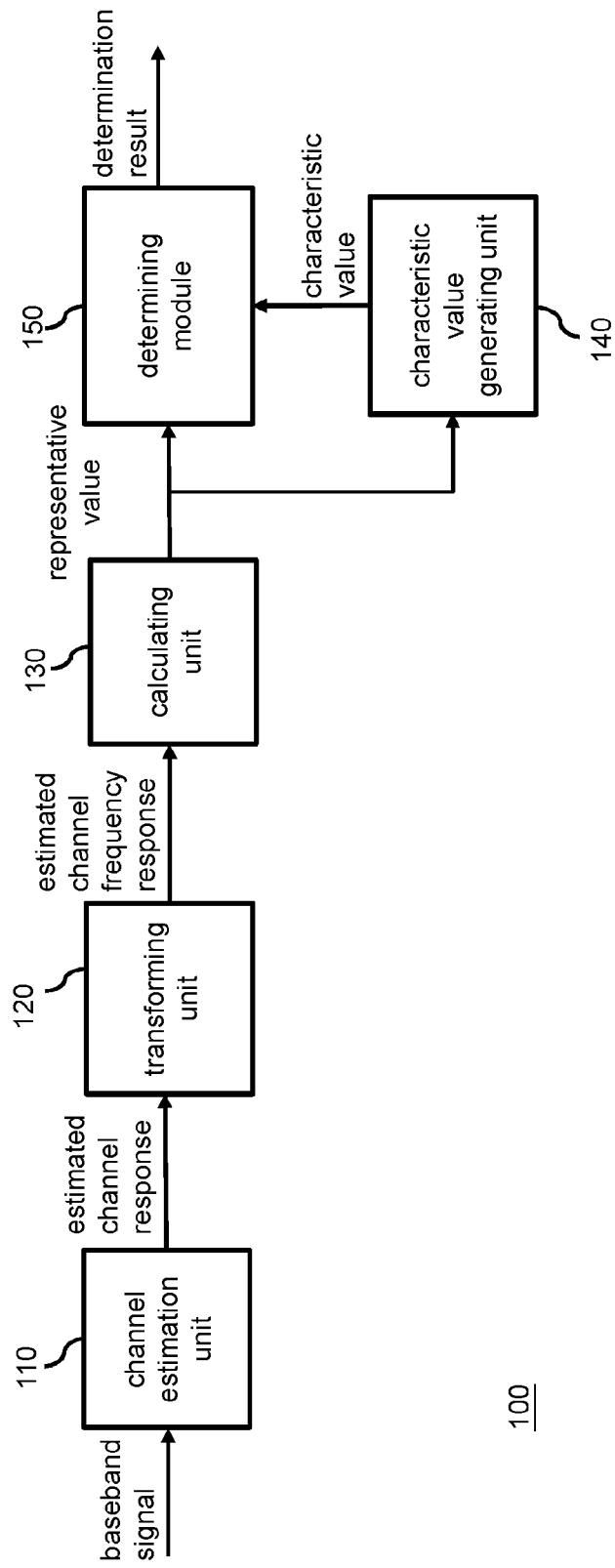
FIG. 1 is a schematic diagram of an echo discriminating device according to an embodiment of the present invention.

FIG. 1 shows a schematic diagram of an echo discriminating device according to an embodiment of the present invention. An echo discriminating device 100 of the embodiment includes a channel estimation unit 110, a transforming unit 120, a calculating unit 130, a characteristic value generating unit 140 and a determining module 150. Any combination of the above circuits may be integrated into an integrated circuit or may be an individual circuit. The echo discriminating device 100 of the embodiment may be applied to a receiver circuit in a wireless communication system. For example, the wireless communication system may adopt Digital Audio Broadcasting (DAB), Digital Multimedia Broadcast-Terrestrial/Handheld (DMB-T/H), Digital Terrestrial Multimedia Broadcast (DTMB), Integrated Services Digital Broadcasting-Terrestrial (ISDB-T) or High-Definition Radio (HD Radio) of OFDM technologies.

Again referring to FIG. 1, the channel estimation unit 110 receives a baseband signal that includes a plurality of subcarriers, and estimates a channel response of a time point according to the subcarriers of the baseband signal to generate a plurality of estimated channel responses, so as to accordingly observe channel characteristics of a wireless channel that a signal passes through. For example, in an OFDM system, the plurality of subcarriers are orthogonal, and each set of the transmitted symbol information is carried by a plurality of subcarriers. The channel estimation unit 110 may perform estimation on different carrier channels through which a plurality of subcarriers of one symbol are transmitted to obtain a plurality of channel responses respectively corresponding to the plurality of subcarriers of one symbol. In one embodiment, the baseband signal may be a pulse signal, and a result generated by the channel estimation unit 110 is an estimated channel impulse response (CIR). In another embodiment, the channel estimation unit 110 adopts pilot-symbol-aided estimation technologies.

The estimated channel responses generated by the channel estimation unit 110 are inputted into the transforming unit 120. According to the estimated channel responses, the transforming unit 120 transforms the time-domain channel responses to frequency-domain channel responses to generate a plurality of estimated channel frequency responses to accordingly observe spectrum characteristics of the wireless channel. For example, in an OFDM system, a plurality of channel responses corresponding to a plurality of subcarrier channels of one symbol may be transformed to a plurality of channel frequency responses by the transforming unit 120. In one embodiment, the transforming unit 120 may be implemented by a fast Fourier transform (FFT) unit adopting FFT.

The estimated channel frequency responses generated by the transforming unit 120 are inputted into the calculating unit 130. According to the estimated channel frequency responses, the calculating unit 130 calculates a representative value of each of the plurality of subcarriers included in the baseband signal to generate a plurality of representative values respectively corresponding to the plurality of subcarriers. For example, in an OFDM system, for a plurality of channel frequency responses corresponding to a plurality of subcarrier of one symbol, a representative value of the channel frequency response corresponding to each of the subcarriers may be calculated by the calculating unit 130. In one embodiment, the approach of calculating the representative value may be calculating an energy value of the estimated channel frequency response, e.g., a square value or a square root of an absolute value.

The plurality of energy values generated by the calculating unit 130 are inputted into the characteristic value generating unit 140. The characteristic value generating unit 140 generates a characteristic value according to the plurality of representative values respectively corresponding to the plurality of subcarriers. For example, in an OFDM system, for a plurality of representative values corresponding to a plurality of subcarrier channels of one symbol, the characteristic value corresponding to the symbol may be calculated by the characteristic value generating unit 140. In one embodiment, the characteristic value may be an average of the representative values corresponding to all of the subcarrier channels. In another embodiment, a weighted average of the representative values of the subcarrier channels may be calculated as the characteristic value, or the representative values corresponding to only a part of the subcarrier channels (i.e., subcarrier channels having a non-zero weighting value) are utilized in the calculation for the characteristic value.

The characteristic value generated by the characteristic value generating unit 140 is inputted into the determining module 150. The determining module 150 obtains a first threshold according to the characteristic value. More specifically, the first threshold is a product of multiplying the characteristic value by a predetermined ratio, which is set by a person performing the implementation. The determining module 150 may obtain a plurality of comparison results according to the characteristic value and the plurality of representative values. For example, the first threshold may be set as 110% of the characteristic value, and the determining module 150 may generate a comparison result according to the first threshold and a representative value corresponding to a subcarrier channel. Thus, in an OFDM system, for a plurality of representative values corresponding to a plurality of subcarrier channels of one symbol, the determining module 150 may generate a plurality of comparison results according to the first threshold and the plurality of representative values. A count is then generated according to the plurality of comparison result, and it is determined whether an echo occurs in the channel according to the count to obtain the determination result. For example, when the first threshold is set as 110% of the characteristic value and a representative value corresponding to a subcarrier channel is greater than the first threshold, the value of a peak count is increased. Further, the determining module 150 may also set a second threshold. When the second threshold is set as 90% of the characteristic value and a representative value corresponding to a subcarrier channel is smaller than the second threshold, the value of a null count is increased. According to a sum of the peak count and the null count, it is determined whether an abnormal deviation from the channel characteristics occurs in a plurality of subcarrier channels corresponding to one symbol, and it is then accordingly determined whether an echo occurs. In one embodiment, if the count (one of the peak count and the null count, or a sum of the two) is greater than a predetermined value, it is determined that the echo occurs. The predetermined value may be a value set according to a programmable threshold or according to other rules by a person performing the implementation.

Figure 2:
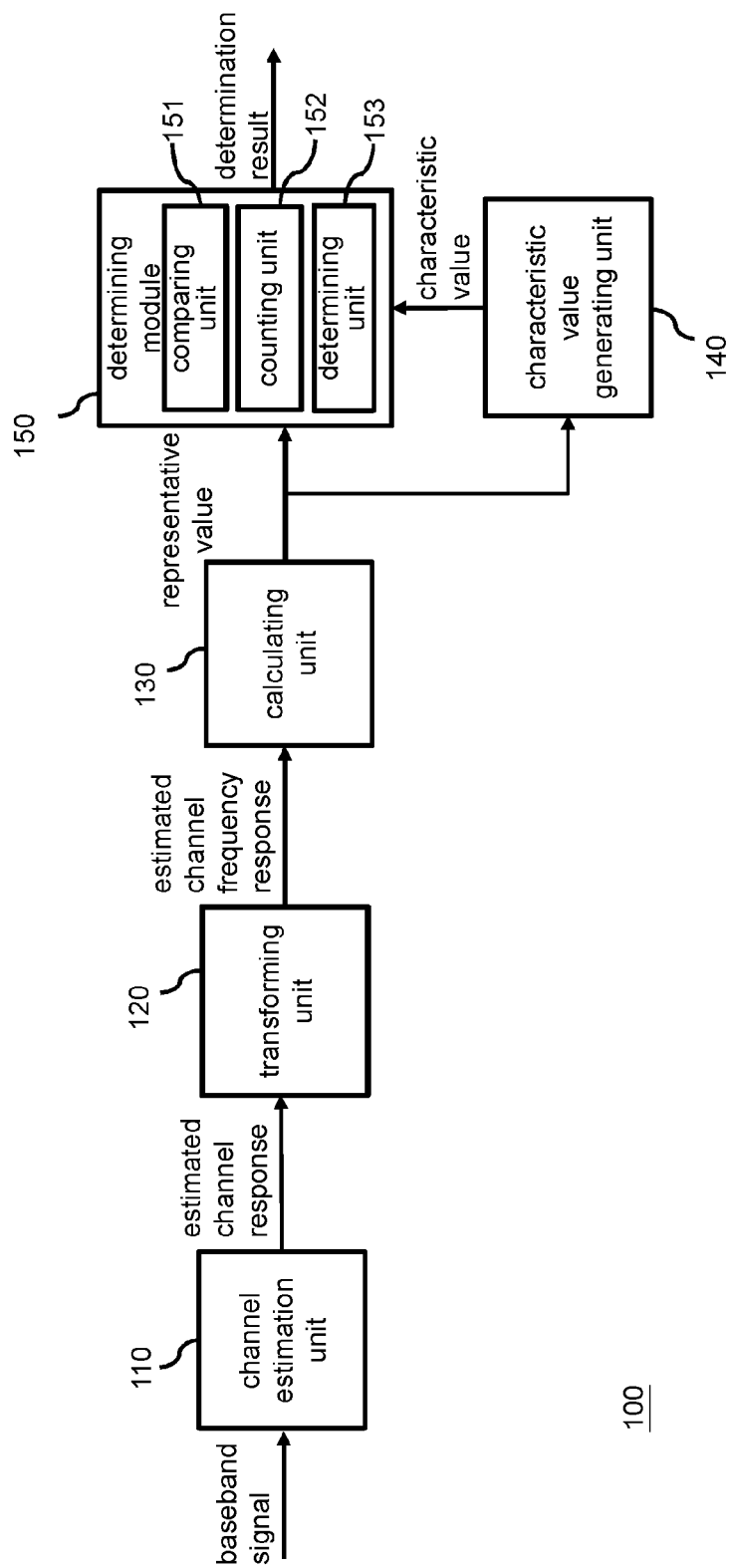
FIG. 2 is a schematic diagram of an echo discriminating device according to another embodiment of the present invention.

FIG. 2 shows a schematic diagram of the echo discriminating device according to another embodiment. As shown in FIG. 2, the determining module 150 may further include a comparing unit 151, a counting unit 152 and a determining unit 153. Any two or all of the above circuits may be integrated into an integrated circuit or be individual circuits. The comparing unit 151 compares all or a part of the plurality of representative values generated by the calculating unit 130 with the first threshold to obtain a plurality of comparison results. The counting unit 152 generates a corresponding count according to the plurality of comparison results. The determining unit 153 determines whether an echo occurs in the channel according to the count and a predetermined value to obtain a determination result. In one embodiment, the first threshold is a product of multiplying the characteristic value generated by the characteristic value generating unit 140 by a predetermined ratio. In one embodiment, the first threshold is a high threshold greater than the characteristic value, e.g., the high threshold is the characteristic value multiplied by 1.1 or 1.2. Next, a first comparator included in the comparing unit 151 compares a representative value corresponding to a subcarrier channel with the high threshold to generated a comparison result. If the comparison result shows that the representative value is greater than the high threshold, a first count generated by a first counter included in the counting unit 152 is added by 1. At this point, the first count represents the peak count, which is a count indicating the number of subcarriers having a corresponding representative value greater than the high threshold. In the same embodiment or in a different embodiment, a second threshold may be set. The second threshold is a low threshold smaller than the characteristic value, e.g., the low threshold is the characteristic value multiplied by 0.8 or 0.9. A second comparator included in the comparing unit 151 compares a representative value corresponding to a subcarrier channel with the low threshold. If the representative value is smaller than the low threshold, a second count value generated by a second counter included in the counting unit 152 is added by 1. At this point, the second count represents the null count, which is a count indicating the number of subcarriers having a corresponding representative value smaller than the low threshold. Details of a method for determining whether an echo occurs are as below. The first count and the second count are added. If a sum of the first count and the second count is greater than a predetermined value, it is determined that the echo occurs. Alternatively, the first count and the second count may be individually compared with the predetermined value, if one of the first count and the second count is greater than the predetermined value, it is determined that the echo occurs. As previously described, the comparison of the high and low thresholds and the counts may be simultaneously or selectively implemented. Further, the comparing unit 151 may include one or multiple comparators, which compare the representative values and the high and low thresholds in the same or different embodiments.

Again referring to FIG. 2, operations of the echo discriminating device 100 are given in an embodiment below. In this embodiment, the echo discriminating device 100 is located at a receiving end of a DTMB or DMB-T/H system, and receives a baseband signal. The baseband signal is an OFDM signal, and includes a plurality of orthogonal subcarriers. The signal is in a unit of signal frames, and one fundamental signal frame is formed by a frame header and a frame body. The signal frame includes a pseudo noise sequence, and the frame body is formed by OFDM symbols. The echo discriminating device 100 is located at a receiving end of a DTMB or DMB-T/H system. The channel estimation unit 110 receives the baseband signal, and estimates a channel response at a time point (e.g., corresponding to a signal frame or a symbol) according to a plurality of subcarriers of the baseband signal to generate a plurality of estimated channel responses. The transforming unit 120 transforms the estimated channel responses from time-domain responses to frequency-domain responses to generate a plurality of estimated channel frequency responses. The calculating unit 130 calculates respective representative values of N subcarriers of the plurality of subcarriers according to the estimated channel frequency responses to generate N representative values. The N subcarriers may be all or a part of the plurality of subcarriers. Among the N subcarriers, a first subcarrier of corresponds to a first representative value, a second subcarrier corresponds to a second representative value, and so forth. The N representative values are inputted into the characteristic value generating unit 140, which calculates the N characteristic values to generate a characteristic value, e.g., an average, or a weighted average according to characteristics of the plurality of subcarrier channels. The characteristic value and the N representative values are all inputted into the determining module 150. The comparing unit 151 of the determining module 150 compares the first representative value with the first threshold to generate a comparison result, wherein the first threshold is set according to the characteristic value. If the comparison result indicates that the first representative value is greater than the first threshold, the count value generated by the counting unit 152 of the determining module 150 is added by 1. Similarly, the comparing unit 151 compares the second representative value with the first threshold to generate a comparison result, wherein the first threshold is set according to the characteristic value. If the comparison result indicates that the second representative value is greater than the first threshold, the count generated by the counting unit 152 is added by 1. When the foregoing comparison and counting steps are performed for all of the N representative values, the count value generated by the counting unit 152 reflects an accumulated result. Further, as previously described, the determining module 150 may also be provided with a second threshold, which is set according to the characteristic value. If the comparison result indicates that the representative value is smaller than the second threshold, the count generated by the counting unit 152 of the determining module 150 is added by one. The other associated principles are identical, and such details shall be omitted herein. The count (i.e., the accumulated result) is compared with a predetermined value. If the count is greater than the predetermined value, it is determined that an echo occurs, i.e., an abnormal deviation from the channel characteristics corresponding to a time point is present. It should be noted that, the orders of the steps of the embodiments are illustrative. In possible implementation, applications with different orders of these steps are also encompassed within the scope of the present invention.

In addition to the device in FIG. 1, the present invention further provides an echo discriminating method, which is performed by the echo discriminating device 100 located at a wireless communication receiver circuit in FIG. 1 or by an equivalent circuit. As shown in FIG. 1, the method according to an embodiment includes following steps.

In step S310, a baseband signal including a plurality of subcarriers is received.

In step S320, a plurality of estimated channel responses are generated according to the plurality of subcarriers of the baseband signal. This step may be performed by the channel estimation unit 110 in FIG. 1 or an equivalent circuit.

In step S330, the estimated channel responses are transformed to generate a plurality of estimated channel frequency responses. This step may be performed by the transforming unit 120 in FIG. 1 or an equivalent circuit. In one embodiment, this step may perform an FFT process to generate the estimated channel frequency responses.

In step S340, a representative value of each of the plurality of subcarriers is calculated according to the estimated channel frequency responses to generate a plurality of representative values. This step may be performed by the calculating unit 130 in FIG. 1 or an equivalent circuit. In one embodiment, the approach of calculating the representative value may be calculating an energy value of the estimated channel frequency response, e.g., a square of an absolute value or a square root of an absolute value.

In step S350, a characteristic value is generated according to the plurality of representative values. This step may be performed by the characteristic value generating unit 140 in FIG. 1 or an equivalent circuit.

In step S360, a count is generated according to a plurality of comparison results of the characteristic value and the plurality of representative values, and it is determined whether the echo occurs according to the count. This step may be performed by the determining module 150 in FIG. 1 or an equivalent circuit. In one embodiment, the step further includes: calculating an average of the plurality of representative values to generate the characteristic value. In another embodiment, this step may calculate a weighted average of the plurality of representative values to generate the characteristic value. In one embodiment, this step further includes: comparing the representative value with a first threshold, and adding the count when the representative value is greater than the first threshold. In one embodiment, this step further includes: comparing the representative value with a second threshold, and increasing the count when the energy value is smaller than the second threshold. In one embodiment, this step further includes: determining that the echo occurs when the count is greater than a predetermined value.

Figure 3:
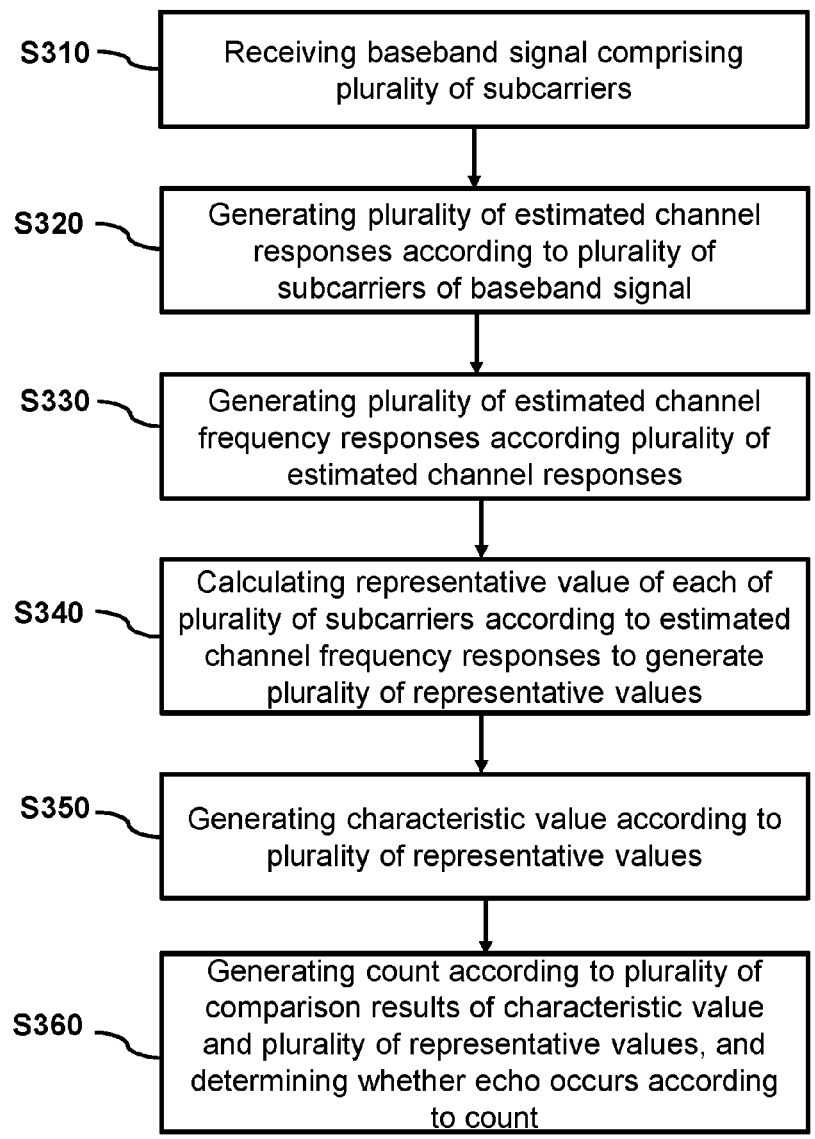
FIG. 3 is an echo discriminating method according to an embodiment of the present invention.

One person skilled in the art can understand the implementation details and variations of the method in FIG. 3 based on the disclosure of the device in FIG. 1 and FIG. 2. Such repeated details shall be omitted herein.

The echo discriminating device 100 according to an embodiment of the present invention receives a baseband signal by a channel estimation unit 110 of a receiver circuit in a wireless communication system, and performs channel estimation according to the baseband signal to obtain estimated channel responses, which are then transformed from the time domain to the frequency domain to obtain estimated channel frequency responses. That is, characteristics of the estimated channel responses are observed in the frequency domain. Energy values of the channel responses are then analyzed, compared and statistically calculated to accordingly discriminate whether an echo occurs in the channel. Compared to conventional solutions, the present invention is capable of preventing misjudgment easily incurred by time-domain signal changes that are not easily observed, thereby correctly discriminating whether an echo occurs.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An echo discriminating device, comprising:
    a channel estimation unit, that receives a baseband signal, and generates a plurality of estimated channel responses according to a plurality of subcarriers of the baseband signal;
    a transforming unit, that transforms the plurality of estimated channel responses to generate a plurality of estimated channel frequency responses;
    a calculating unit, that calculates a representative value of each of the plurality of subcarriers according to the plurality of estimated channel frequency responses to generate a plurality of representative values;
    a characteristic value generating unit, that generates a characteristic value according to the plurality of representative values; and
    a determining module, that determines whether an echo occurs according to the characteristic value and the plurality of representative values.

2. The echo discriminating device according to claim 1, wherein the calculating unit calculates an energy value of each of the plurality of subcarriers to serve as the representative value.

3. The echo discriminating device according to claim 2, wherein the energy value calculated by the calculating unit is a square of a corresponding estimated channel frequency response among the plurality of estimated channel responses.

4. The echo discriminating device according to claim 2, wherein the energy value calculated by the calculating unit is a square root of an absolute value of a corresponding estimated channel frequency response among the plurality of estimated channel responses.

5. The echo discriminating device according to claim 2, wherein the characteristic value generating unit calculates a weighted average of the plurality of energy values to generate the characteristic value.

6. The echo discriminating device according to claim 1, wherein the determining module comprises:
    a comparing unit, that compares the plurality of representative values with a first threshold to generate a plurality of first comparison results, wherein the first threshold is determined according to the characteristic value;
    a counting unit, that generates a count according to the plurality of first comparison results; and
    a determining unit, that determines whether the echo occurs according to the count.

7. The echo discriminating device according to claim 6, wherein the comparing unit further compares the plurality of representative values with a second threshold to generate a plurality of second comparison results, and the counting unit generates the count according to the plurality of first comparison results and the plurality of second comparison results.

8. The echo discriminating device according to claim 6, wherein it is determined that the echo occurs when the count is greater than a predetermined value.

9. The echo discriminating device according to claim 1, wherein the baseband signal received by the channel estimation unit corresponds to a symbol.

10. An echo discriminating method, performed by a receiver, comprising:
    receiving a baseband signal comprising a plurality of subcarriers;
    generating a plurality of estimated channel responses according to the plurality of subcarriers of the baseband signal;
    transforming the plurality of estimated channel responses to generate a plurality of estimated channel frequency responses;
    calculating a representative value of each of the plurality of subcarriers according to the plurality of estimated channel frequency responses to generate a plurality of representative values;
    generating a characteristic value according to the plurality of representative values;

comparing the plurality of representative values with a first threshold to generate a plurality of first comparison results, wherein the first threshold is determined according to the characteristic value;

generating a count according to the plurality of first comparison results; and determining whether an echo occurs according to the characteristic value, the plurality of representative values and the count.

11. The echo discriminating method according to claim 10, wherein the step of calculating the representative value comprises calculating an energy value of each of the plurality of subcarriers to serve as the representative value.

12. The echo discriminating method according to claim 11, wherein the step of calculating the energy value comprises calculating a square of a corresponding estimated channel frequency response among the plurality of estimated channel responses to serve as the energy value.

13. The echo discriminating method according to claim 11, wherein the step of calculating the energy value comprises calculating a square root of an absolute value of a corresponding estimated channel frequency response among the plurality of estimated channel responses to serve as the energy value.

14. The echo discriminating method according to claim 11, wherein the step of generating the characteristic value comprises calculating a weighted average of the plurality of energy values to generate the characteristic value.

15. The echo discriminating method according to claim 10, further comprising:

comparing the plurality of representative values with a second threshold to generate a plurality of second comparison results;

wherein, the second threshold is determined according to the characteristic value, and the count is generated according to the plurality of first comparison results and the plurality of second comparison results.

16. The echo discriminating method according to claim 10, further comprising determining that the echo occurs when the count is greater than a predetermined value.

17. The echo discriminating method according to claim 10, wherein in the step of receiving the baseband signal comprising the plurality of subcarriers, the baseband signal corresponds to a symbol.

* * * * *